(No Model.)
C. H. SLOCOM.
TACK PULLER.
No. 436,157.  Patented Sept. 9, 1890.
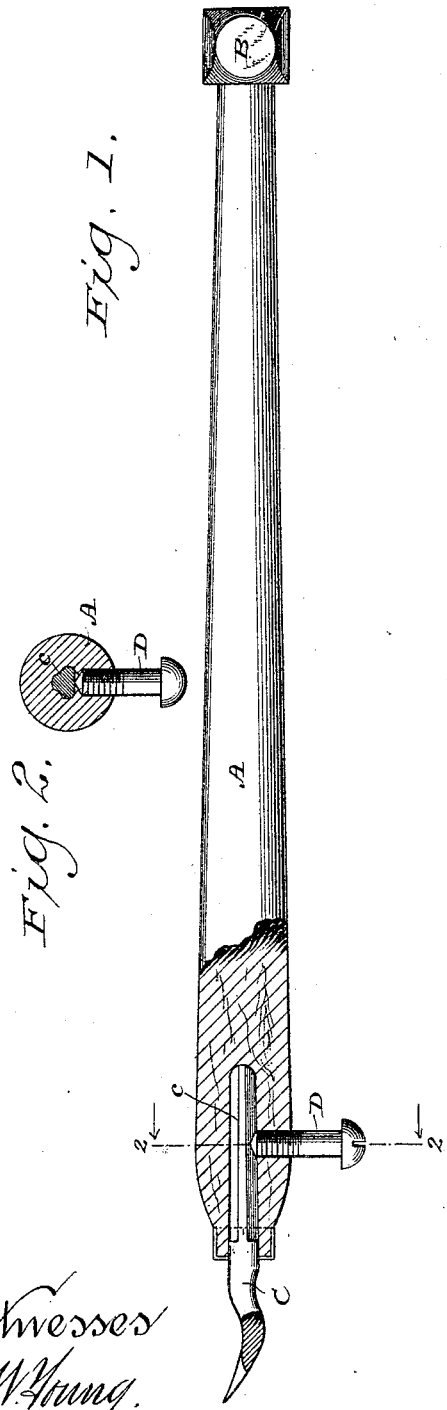
Witnesses
Geo. W. Young
Jno. L. Condron
Inventor
Caroline H. Slocom
By H. G. Underwood
Attorney

UNITED STATES PATENT OFFICE.

CAROLINE H. SLOCOM, OF MILWAUKEE, WISCONSIN.

TACK-PULLER.

SPECIFICATION forming part of Letters Patent No. 436,157, dated September 9, 1890.

Application filed April 3, 1890. Serial No. 346,418. (No model.)

*To all whom it may concern:*

Be it known that I, CAROLINE H. SLOCOM, of Milwaukee, in the county of Milwaukee, and in the State of Wisconsin, have invented certain new and useful Improvements in Tack-Pullers; and I do hereby declare that the following is a full, clear, and exact description thereof.

My invention relates to appliances for drawing tacks, nails, &c., out of a carpet, floor, or other object into which they have been driven; and my invention consists in certain peculiar and novel features of construction and arrangement, as hereinafter described, and specifically pointed out in the appended claim.

In order that my invention may be fully understood, I will proceed to describe it with reference to the accompanying drawings, in which—

Figure 1 is a side elevation, partially in longitudinal section, of one form of my improved tack-puller. Fig. 2 is a cross-section of the same on the line 2 2 of Fig. 1.

Referring now to the drawings, A designates the handle of a tack-hammer, B being the head, and C designates the claw, which is inserted in the end of the handle remote from the head B in the usual or any preferred manner. The claw C itself may be either of the precise form shown or of any other suitable form, the stem $c$ of the claw extending into the handle A a sufficient distance to retain the claw in proper connection with the handle.

D designates the fulcrum, which is a screw inserted radially into the handle at a point between the inner and outer ends of the stem $c$ and so as to project from the handle at right angles to its axial center and coincident with the back of the claw C. The inner end of the screw abuts against the stem $c$, which may be formed with a nick or indentation, into which the inner end of the screw enters. This construction possesses the merit, besides that of a permanent fulcrum, of aiding to retain the claw-stem within the handle.

From the foregoing it will be seen that when it is desired to draw a tack or nail the claws C are inserted beneath the head of the same and the handle is depressed upon the projection D, which thus forms a perfect fulcrum and affords a powerful leverage for the handle. Thus it will be seen that I have produced an extremely simple but highly useful attachment to tack-pullers, which renders them effective for the purpose for which they are designed.

Having thus described my invention, what I claim as new, and desire to secure by Letters Patent, is—

The combination, with a handle and a claw having its stem inserted longitudinally into one end of the handle, of a detachable fulcrum-piece inserted transversely into the handle adjacent to the claw and abutting at its inner end against the stem of said claw, substantially as described.

In testimony that I claim the foregoing I have hereunto set my hand, at Milwaukee, in the county of Milwaukee and State of Wisconsin, in the presence of two witnesses.

CAROLINE H. SLOCOM.

Witnesses:
 H. G. UNDERWOOD,
 WM. KLUG.